United States Patent van Wingen born Looyen

[11] Patent Number: 5,320,583
[45] Date of Patent: Jun. 14, 1994

[54] PROTECTOR FOR FRONT CHAIN SPROCKET OF A BICYCLE

[75] Inventor: Johanna W. van Wingen born Looyen, Barneveld, Netherlands

[73] Assignee: De Woerd B.V., Barneveld, Netherlands

[21] Appl. No.: 822,070

[22] Filed: Jan. 17, 1992

[51] Int. Cl.⁵ .............................. B62J 13/00
[52] U.S. Cl. ..................... 474/144; 474/151; 74/594.2; 74/609
[58] Field of Search ............ 474/49, 56, 80, 140, 474/144, 151, 160; 74/594.2, 609, DIG. 10

[56] References Cited

U.S. PATENT DOCUMENTS

| | | | |
|---|---|---|---|
| 504,121 | 8/1893 | Cheesman | 474/144 |
| 846,239 | 3/1907 | Osborne | 74/594.2 |
| 877,820 | 1/1908 | Badger | 474/144 |
| 951,137 | 3/1910 | Lowrance | 74/594.2 X |
| 1,136,411 | 4/1915 | Davis | 74/609 |
| 3,477,303 | 11/1969 | Brilando | 474/144 |
| 3,815,439 | 6/1974 | Tarutani | 474/144 |
| 4,418,584 | 12/1983 | Shimano | 74/594.2 |
| 4,487,424 | 12/1984 | Ellis | 74/594.2 X |
| 4,704,919 | 11/1987 | Durham | 74/594.2 X |
| 5,003,840 | 4/1991 | Hinschlager | 474/140 X |

Primary Examiner—Ramon S. Britts
Assistant Examiner—Roger J. Schoeppel
Attorney, Agent, or Firm—Sandler, Greenblum & Bernstein

[57] ABSTRACT

This invention is directed to a protector for a single or front chain sprocket of a bicycle. The sprocket assembly is mounted on a pedal shaft and is non-rotatably coupled with a sprocket-side pedal. The protector comprises a disc which is adapted to be fixed by a fixing mechanism with respect to the pedal shaft and having a diameter which is sufficient for preventing soiling or damaging clothing or body portions of the user of the bicycle.

26 Claims, 2 Drawing Sheets

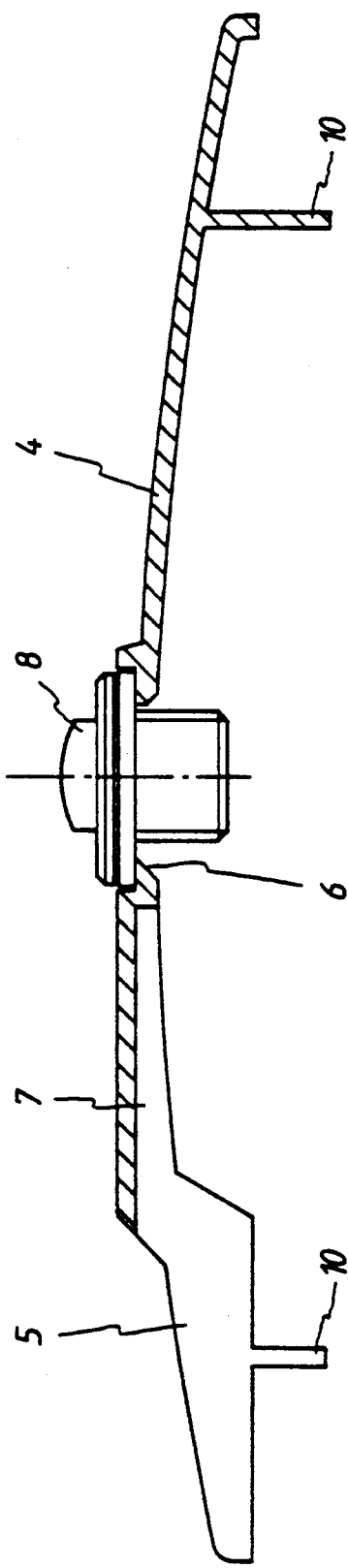

PROTECTOR FOR FRONT CHAIN SPROCKET OF A BICYCLE

BACKGROUND OF THE INVENTION

1. Field of the Invention

The invention relates to a protector for a single or multiple front chain sprocket of a bicycle, said sprocket being mounted on a pedal shaft and being non-rotatably coupled with a sprocket-side pedal. Multiple sprockets comprise two or more sprocket parts of different diameter, a selecting device being present for selectively engaging the chain with one of the sprockets so as to allow the the transmission ratio to be varied accordingly in combination with one or more sprockets on the rear wheel shaft of the bicycle.

2. Discussion of the Background Information

In the case of sports bicycles, such as racing bicycles, all-terrain bicycles (ATB's) and so-called mountain bikes, the chain drive assembly is unprotected, thus exposing the legs and/or clothing of the user to soiling and even damage. On the other hand, the exposed sprocket can be damaged when riding in rougher surroundings, e.g., by stones, which should, in particular, be avoided in the case of rather expensive multiple sprockets.

Since in particular the last two bicycle types are becoming more and more popular all over the world, there is a need for means for providing an efficient protection of the user of such a bicycle and also of the sprocket.

The invention provides a protector for this kind which is adapted to provide an efficient protection, and can be easily mounted on the current bicycles.

BRIEF DESCRIPTION OF THE DRAWINGS

The invention will now be elucidated by reference to a drawing of a preferred embodiment of the object of the invention, showing in:

FIG. 2 a cross-section of this protector.

DETAILED DESCRIPTION OF THE INVENTION

Figure 1:
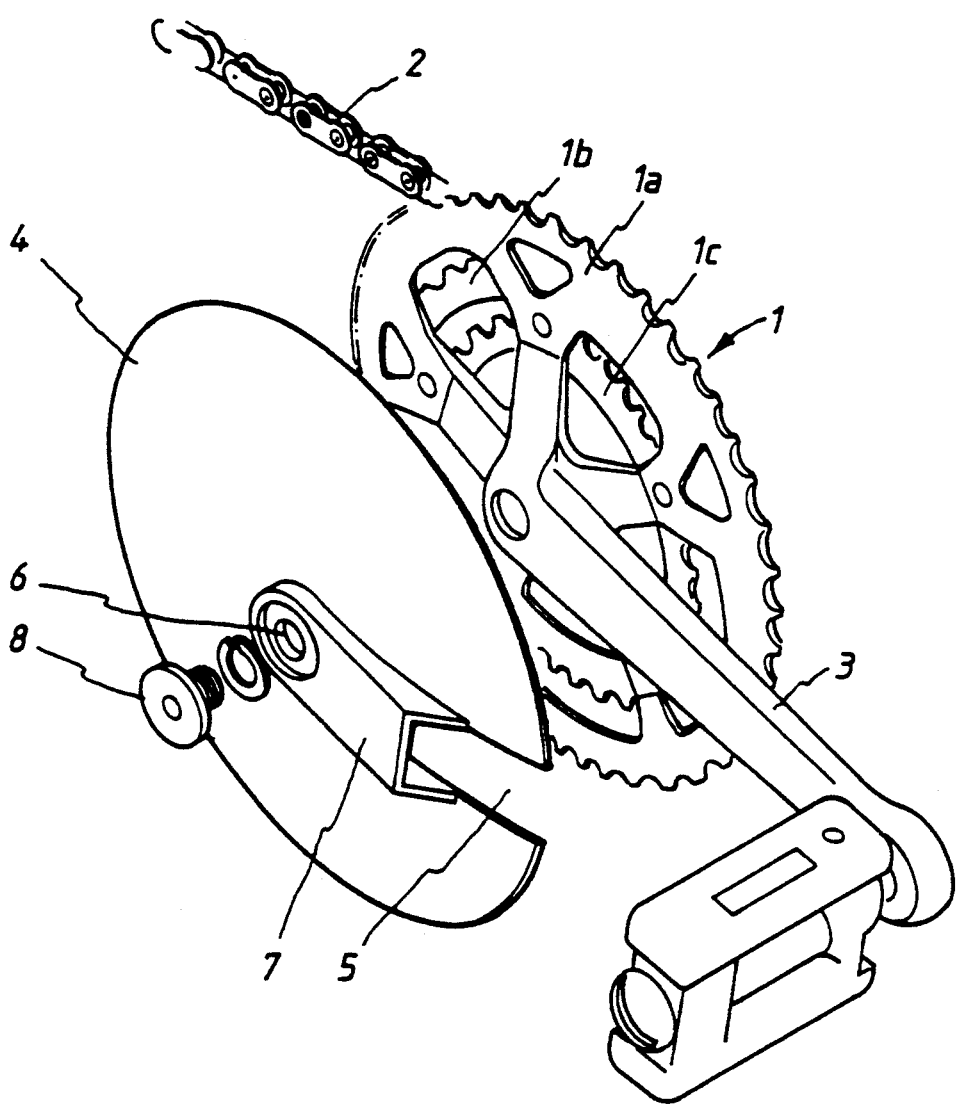
FIG. 1 an exploded view of a sprocket assembly of a bicycle and an associated protector of the invention.

In FIG. 1 a multiple sprocket 1, consisting of three sprocket parts 1a, 1b and 1c, is shown, as well as an associated chain 2 of a bicycle, the remaining parts of the bicycle being omitted for the sake of clarity since these are of current design and form no part of the invention. It will be clear that the number of sprocket parts can be smaller or larger than three, including a single sprocket. The chain 2 can be shifted from one sprocket portion to another one by current chain shifting means not shown so as to vary the transmission ratio of the chain drive.

The multiple sprocket (or single sprocket) 1 is coupled with a pedal 3, and the sprocket pedal assembly is to be mounted in the usual manner on a pedal shaft not shown. The protector of the invention is formed by a disc 4 made of plastics. This disc comprises a recess 5 terminating in a central hole 6, which recess is partly covered by a cap portion 7 with a U-shaped cross-section. The width of this recess 6 corresponds with the width of the pedal 3.

The disc 4 is mounted on the sprocket-pedal assembly by means of a screw 8 inserted into the hole 6 and screwed in a threaded hole 9 of the pedal. The recess 5 and cap portion 7 fitting around the pedal 3 keep the disc in a fixed angular relationship with the pedal 3.

As shown in FIG. 2, a projecting rim 10, or similar projecting lugs or the like, can be formed on the inner surface of the disc 4; which, in the mounted condition, keep the disc 4 at a uniform distance from the adjacent sprocket 1a.

The outer diameter of the disc 4 is preferably larger than the outer diameter of the adjacent sprocket 1a (which is generally the larger one of the set of sprockets), including the chain portion on this sprocket, so as to provide an efficient protection against clothing parts coming into contact with the chain.

Apart from protecting the user of a bicycle agains soiling or damage of his closing or his leg, such a disc also protects the sprocket 1 against contact with hard objects which might damage the sprocket.

Such a protecting disc can be easily mounted on a bicycle, and does not substantially increase the weight thereof. In contrast to the usual chain casings or protecting rims, this disc will not be damaged by rough handling or contact with hard objects.

In the case of bicycles not having an axially threaded hole 9 in the pedal shaft, such a disc 4 can be mounted on a sprocket by means of one or more screws to be screwed in a corresponding hole in the adjacent sprocket part or in the pedal 3.

It will be clear that within the scope of the invention many modifications are possible.

What is claimed is:

1. A protector for a single or multiple front chain sprocket of a bicycle, the single or multiple front chain sprocket being mounted on the pedal crank shaft of the bicycle and being non-rotatably coupled with a sprocket-side pedal crank thereof, said protector comprising:

a disc comprising a diameter which is sufficient for preventing soiling or damaging of clothing or body portions of a user of a bicycle; said disc comprising a recess adapted to fit around a sprocket-side pedal crank, and adapted to cover at least a substantial portion of the sprocket-side pedal crank from the pedal crank shaft towards an outer extremity of the sprocket-side pedal crank; and fixing means for fixing said disc to the pedal crank shaft, said fixing means comprising a screw adapted to cooperate with a threaded hole in the pedal crank shaft.

2. The protector according to claim 1, wherein said disc comprises an outer diameter that is larger than an outer diameter of a sprocket to be protected.

3. The protector according to claim 1, wherein said disc includes means for keeping said disc at a uniform distance from an adjacent sprocket on an inner side of said disc.

4. The protector according to claim 3, wherein said means for keeping said disc at a uniform distance comprise a projecting rim on said inner side of said disc.

5. The protector according to claim 1, wherein said disc comprises a unitary plastic element.

6. The protector according to claim 1, wherein said screw is adapted to cooperate with an axially threaded hole in the pedal crank shaft.

7. The protector according to claim 1 further comprising a cap portion covering said recess.

8. The protector according to claim 7 wherein said cap portion includes an aperture at a central portion of said recess through which said screw can be inserted to cooperate with the threaded hole in the pedal crank shaft.

9. In combination, a bicycle having a single or multiple front chain sprocket, the single or multiple front chain sprocket being mounted on the pedal crank shaft of the bicycle and being non-rotatably coupled with a sprocket-side pedal crank thereof, and a protector, said protector comprising:

a disc comprising a diameter which is sufficient for preventing soiling or damaging of clothing or body portions of a user of the bicycle; said disc comprising a recess fitting around a sprocket-side pedal crank, and covering at least a substantial portion of the sprocket-side pedal crank from the pedal crank shaft towards an outer extremity of the sprocket-side pedal crank; and a screw cooperating with a threaded hole in the pedal crank shaft for fixing the disc to said pedal crank shaft.

10. The combination according to claim 9, further comprising a cap portion covering said recess.

11. The combination according to claim 10, wherein said cap portion includes an aperture at a central portion of said recess through which said screw can be inserted to cooperate with the threaded hole in the pedal crank shaft.

12. The combination according to claim 9, wherein said disc comprises an outer diameter that is larger than an outer diameter of a sprocket to be protected.

13. The combination according to claim 9, wherein said disc includes means for keeping said disc at a uniform distance from an adjacent sprocket on an inner side of said disc.

14. The combination according to claim 13, wherein said means for keeping said disc at a uniform distance comprise a projecting rim on said inner side of said disc.

15. The combination according to claim 9, wherein said disc comprises a unitary plastic element.

16. The combination according to claim 9, wherein said threaded hole in the pedal crank shaft comprises an axially threaded hole.

17. In combination, a bicycle having a single or multiple front chain sprocket of a bicycle, the single or multiple front chain sprocket being mounted on the pedal crank shaft of the bicycle and being non-rotatably coupled with a sprocket-side pedal crank thereof, and a protector, said protector comprising:

a disc comprising a diameter which is sufficient for preventing soiling or damaging of clothing or body portions of a user of the bicycle; said disc comprising a recess fitting around a sprocket-side pedal crank, and covering at least a substantial portion of the sprocket-side pedal crank from the pedal crank shaft towards an outer extremity of the sprocket-side pedal crank; and at least one screw cooperating with at least one threaded hole in a sprocket to be protected for fixing the disc to said sprocket to be protected.

18. The combination according to claim 17, wherein said disc comprises an outer diameter that is larger than an outer diameter of the sprocket to be protected.

19. The combination according to claim 17, wherein said disc includes means for keeping said disc at a uniform distance from the sprocket to be protected on an inner side of said disc.

20. The combination according to claim 17, wherein said disc comprises a unitary plastic element.

21. The combination according to claim 17, further comprising a cap portion covering said recess.

22. A protector for a single or multiple front chain sprocket of a bicycle, the single or multiple front chain sprocket being mounted on the pedal crank shaft of the bicycle and being non-rotatably coupled with a sprocket-side pedal crank thereof, said protector comprising:

a disc comprising a diameter which is sufficient for preventing soiling or damaging of clothing or body portions of a user of a bicycle; said disc comprising a recess adapted to fit around a sprocket-side pedal crank, and adapted to cover at least a substantial portion of the sprocket-side pedal crank from the pedal crank shaft towards an outer extremity of the sprocket-side pedal crank; and fixing means for fixing said disc to the pedal crank shaft, said fixing means comprising at least one screw adapted to cooperate with at least one threaded hole in a sprocket to be protected.

23. The protector according to claim 22, wherein said disc comprises an outer diameter that is larger than an outer diameter of the sprocket to be protected.

24. The protector according to claim 22, wherein said disc includes means for keeping said disc at a uniform distance from an adjacent sprocket on an inner side of said disc.

25. The protector according to claim 22, wherein said disc comprises a unitary plastic element.

26. The protector according to claim 22, further comprising a cap portion covering said recess.

* * * * *

UNITED STATES PATENT AND TRADEMARK OFFICE
CERTIFICATE OF CORRECTION

PATENT NO. : 5,320,583
DATED : June 14, 1994
INVENTOR(S) : Johanna W. VAN WINGEN It is certified that error appears in the above-indentified patent and that said Letters Patent is hereby corrected as shown below:

At column 1, line 65, change "6" to ---5---.

At column 2, line 65 (claim 7, line 1), change "claim 1" to ---claim 1,---.

At column 2, line 67 (claim 8, line 1), change "claim 7" to ---claim 7,---.

Signed and Sealed this

Sixth Day of May, 1997

*Attest:*

BRUCE LEHMAN

*Attesting Officer*   Commissioner of Patents and Trademarks